Dec. 22, 1964     H. J. HART     3,162,042
FLOWMETER APPARATUS
Filed June 20, 1960     3 Sheets-Sheet 3
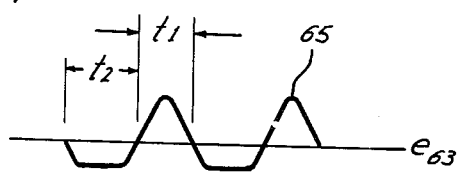
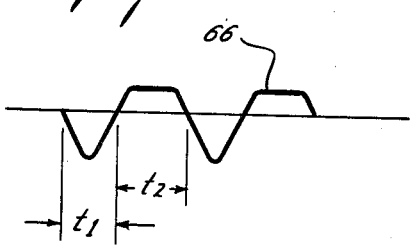
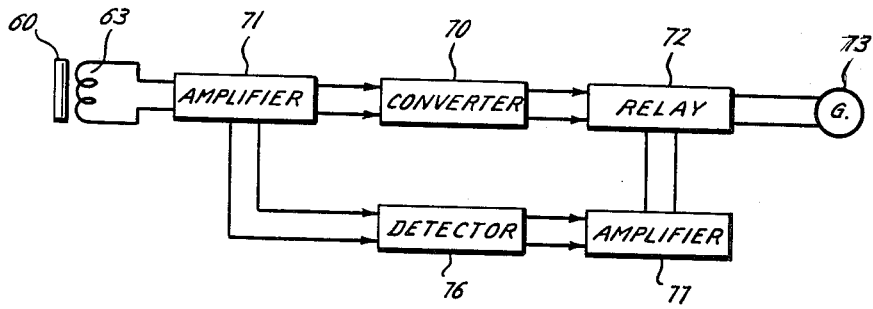
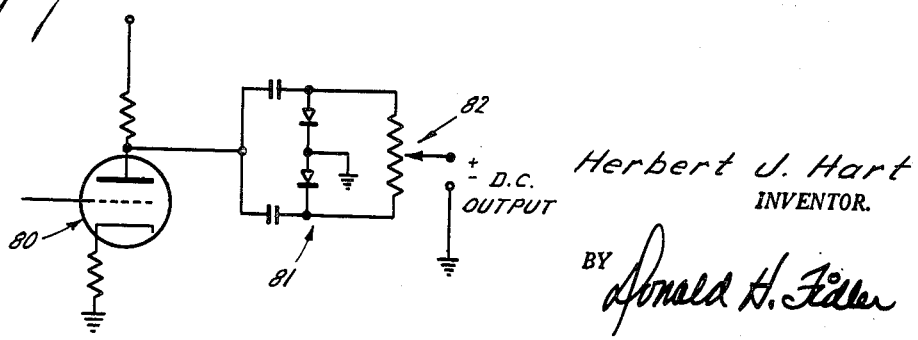
Herbert J. Hart
INVENTOR.
BY Donald H. Fidler
ATTORNEY United States Patent Office 3,162,042
Patented Dec. 22, 1964

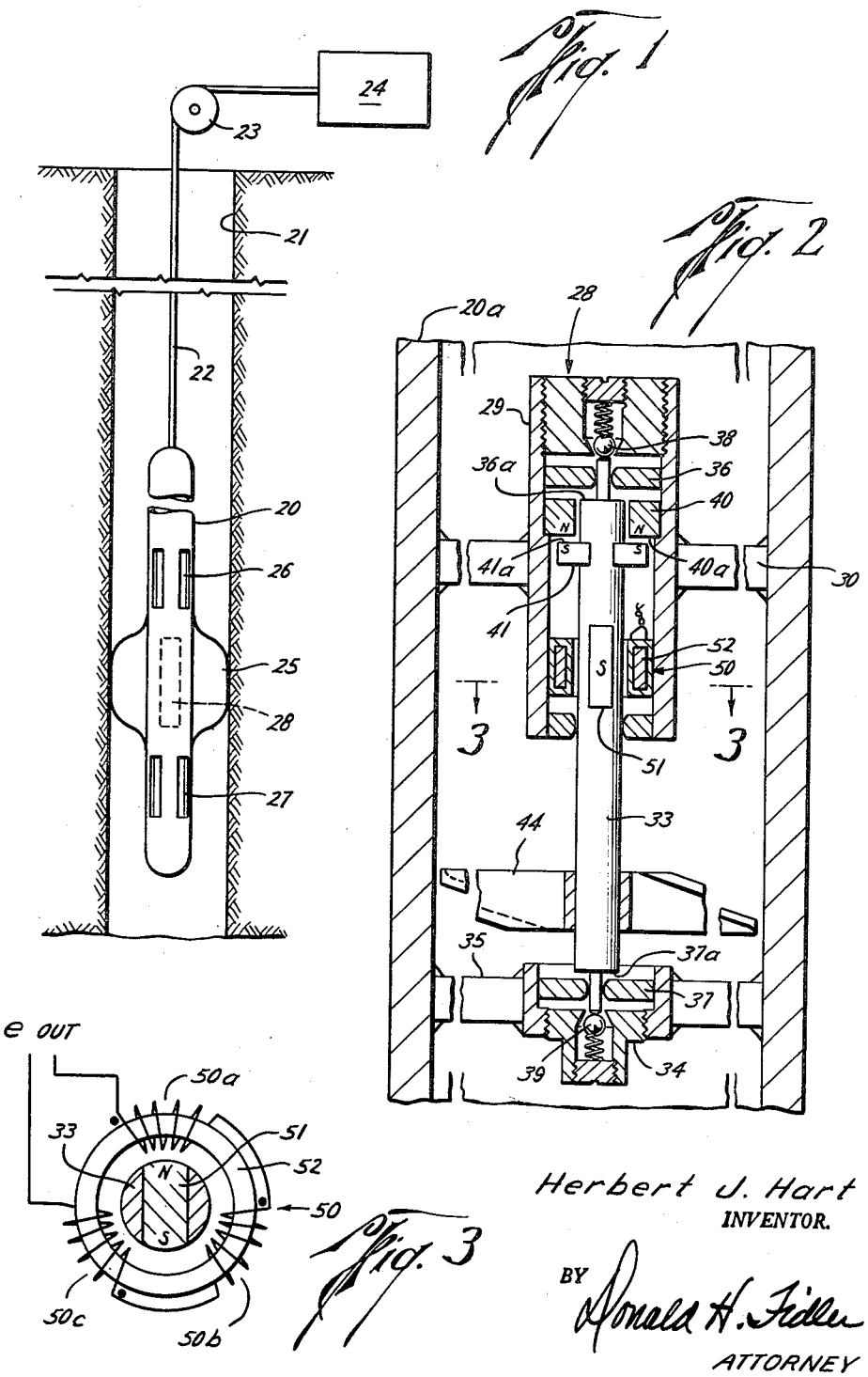

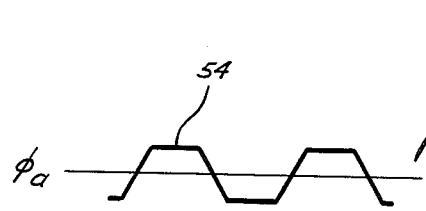
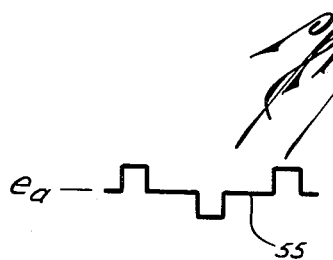
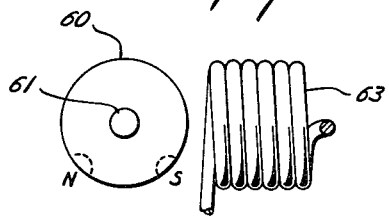
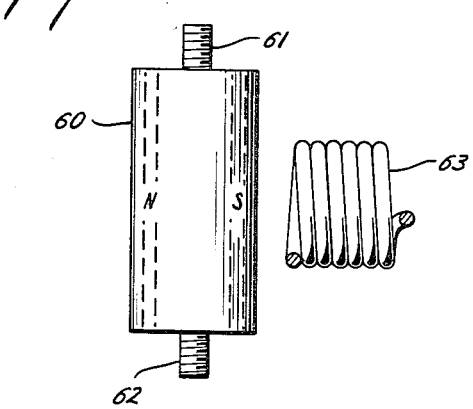

3,162,042
FLOWMETER APPARATUS
Herbert J. Hart, Houston, Tex., assignor to Schlumberger Well Surveying Corporation, Houston, Tex., a corporation of Texas
Filed June 20, 1960, Ser. No. 37,147
9 Claims. (Cl. 73—155)

This invention relates to flowmeters for use in wells and, more particularly, flowmeter apparatus including improved spinner arrangements and spinner rate detection systems for obtaining reliable indications of the rate and direction of fluid flow through a well bore.

Flowmeters for use in well bores are generally classified as either of the packer or packerless type. Such flowmeters generally include a passageway open at inlet and outlet orifices to the exterior of the tool and a spinner section which measures the rate of fluid flow through the passageway. In a packer-type flowmeter, the horizontal cross section of the well bore, say seven inches in diameter, is packed off and the entire fluid flow is directed through the tool for fairly low rates of flow, for example, from 20 b.p.d. to 800 b.p.d. In a packerless-type flowmeter, which is sometimes used for determining the rate of flow in water injection processes, the flowmeter generally operates at higher rates of flow, for example, from 200 b.p.d. to 80,000 b.p.d. and higher.

In a typical flowmeter spinner section, a spinner is rotated under the influence of the fluid flow at an angular velocity proportional to the velocity of the fluid flow, and the rotation is detected by a sensing system to provide an indication of the velocity of fluid flow.

In the typical spinner assembly, particularly for low rates of fluid flow, it is difficult to physically mount the spinner for perfectly free rotation and to detect the true angular velocity of the spinner to provide accurate indications because of friction forces and other retarding forces in the assembly.

Accordingly, it is an object of the present invention to provide a flowmeter having a new and improved, relatively frictionless, spinner mounting for use in a well bore.

A further object of the present invention is to provide a new and improved flowmeter arranged sensing system for reliably determining the direction and rate of fluid flow in a well bore over a wide range of conditions.

In accordance with the present invention, a spinner is supported for rotation relatively free of mechanical retarding forces by magnetic means and has relatively low friction means to absorb endwise loading of the spinner. Sensing means to detect the angular velocity of the spinner shaft to include a magnet and coil and, in one aspect of the present invention, the coil and magnet arrangement provide indications of the direction of fluid flow.

The novel features of the present invention are set forth with particularity in the appended claims. The present invention, both as to its organization and manner of operation, together with further objects and advantages thereof, may best be understood by way of illustration and example of certain embodiments when taken in conjunction with the accompanying drawings in which:

FIG. 1 is a schematic view of a flowmeter disposed in a well bore;

FIG. 2 is a cross-section view of a spinner assembly embodying the present invention;

FIG. 3 is a partial cross-sectional view of the detecting system of the spinner assembly taken along line 3—3 of FIG. 2;

FIGS. 4–6 depict flux and voltage variations characteristic of the system of FIG. 3;

FIGS. 7 and 8 are top and side views of another embodiment of detecting system;

FIGS. 9 and 10 depict voltages characteristic of the system of FIGS. 7 and 8;

FIG. 11 is a schematic diagram of a complete electrical detecting system including the portions illustrated in FIGS. 7 and 8; and FIG. 12 is a circuit diagram of a component of the detecting system of FIG. 11.

Referring now to FIG. 1, a flowmeter apparatus 20 is adapted to be suspended in a well bore 21 by means of a cable 22 and winch 23 in a customary manner. Indicator means 24, at the surface of the ground, are provided to obtain the representations or indications of the rate of fluid flow in the well bore, either stationary or as a function of depth, for example. Flowmeter 20 may be of the packerless type or may include a packer 25. The flowmeter 20 has upper and lower orifices 26 and 27, respectively opening to the upper and lower ends of a passageway extending longitudinally through the flowmeter. Intermediate the orifices is a spinner assembly 28 which measures the velocity of the fluid flow.

Referring now to FIG. 2, the spinner assembly 28 illustrated in a section of the flowmeter 20 is one particularly useful for a packerless type of flowmeter to measure extremely low rates of fluid flow. The passageway through the flowmeter 20, intermediate of the orifices 26 and 27, is formed by the interior of a tubular section 20a of flowmeter 20. The spinner assembly 28 includes a spinner housing 29 centrally secured within the section 20a by three or more radially-extending support members 30 which form a spider-like support for spinner housing 29, and a spinner shaft 33 having one end rotatably mounted in the spinner housing 29 and the remaining end mounted in a supporting cap 34. The supporting cap 34 is centrally secured within section 20a by three or more radially-extending support members 35, similarly arranged in a spider-like arrangement. The spider-like arrangement and sizing of support members 30, 35 is such that flow of fluid through section 20a is relatively unimpeded. A spinner 44 preferably comprising three or more, helically-curved, spinner blades is mounted on shaft 33 at its lower end to rotate the spinner shaft 33 in response to a flow of fluid through section 20a.

Spinner housing 29 is hollow and, in the hollow interior, is a low friction annular bearing 36, such as an olive ringstone which is secured near its upper end and laterally supports the spinner shaft for rotation about its axis. The lower cap 34 similarly has a low friction annular bearing 37 to support the lower end of the spinner shaft 33. The bearings 36, 37 and shaft 33, of course, have sufficient clearance with respect to one another that moderate wear will not appreciably misalign the axis of the shaft 33. The bearings 36, 37 also quite naturally bear the radial loads of the shaft. The ends of the spinner shaft 33 in the bearings 36, 37 are reduced in diameter to form shoulders 36a and 37a which therefore provide a positive stop for excessive endwise movement of the shaft relative to the respective bearings 36, 37 due to extremely high velocity fluid flows. To absorb moderate end loading of the shaft 33 for a medium velocity range of fluid flows, the housing 29, at its upper end, has a receptacle to receive a spring-loaded carbide ball 38, which bears downwardly against the end of the shaft. Cap member 34 likewise has a receptacle for a spring-loaded carbide ball 39, which bears upwardly against the other end of the shaft. The ends of the shaft 33 are polished to present a low friction bearing surface riding on the polished surfaces of the tungsten carbide balls 38, 39.

To suspend the spinner shaft 33 and spinner 44 relative to the housing 29, an annular or ring magnet 40 is attached to the interior of the housing and another annular or ring magnet 41 is attached therebelow to the spinner shaft 33. For mutual attraction, the magnets 40, 41 are polarized so that the facing surfaces 40a, 41a of the magnets are of opposite polarity to one another. The strength of the magnets in relation to the spacing therebetween is made adequate to sustain the weight of the shaft 33 and spinner 44.

The bearing system above-described is adjusted in a straightforward manner. First, a preloading of the springs against the balls 38, 39 is backed off until the shaft 33 is free from the force of the magnets 40, 41 and rests on the lower ball 39. Next, slow inward movement of the lower end plug serves to bring the magnets 40, 41 closer together until, at some point, the magnetic forces take effect snapping the shaft 33 upwardly against the upper ball 38. The lower ball 39 is now backed off slightly until the shaft 33, if it were pushed down lightly by hand from above, would drop once more away from the magnetic support. In this condition, the shaft is supported, partially magnetically and partially by the lower ball 39. The upper ball 38 is now brought down far enough that any vertical jar to the spinner shaft cannot throw it up into a completely magnetic suspension once more. The considerable freedom from friction of this condition is indicated by the fact that a light breath will now turn the spinner 44.

From the foregoing, it will be appreciated that, at rest, the weight of the shaft 33 and spinner 44 is primarily supported by the interacting fields of magnets 40, 41. Hence, there is little starting torque to overcome, since the loading of the shaft on the balls 38, 39 is only a small fraction of the shaft weight. As the shaft is rotated and its speed increases, the longitudinal or endwise loading also generally increases. The ball bearings 38, 39, of course, are thrust bearings for handling moderate longitudinal or endwise loads. Should the loading increase until the shoulders 36a or 37a abut a bearing 36 or 37 under excessively high velocity fluid flow, there will be relatively little thrust bearing friction torque to be overcome as compared to the torque developed by the fluid being metered. Hence, it will be appreciated that the foregoing described spinner assembly provides an extremely low starting torque and a wide dynamic range of operation.

The sensing system for detecting the rotation of spinner shaft 33 includes a detecting coil assembly 50 attached in housing 29, and a bar magnet 51 mounted in shaft 33 to extend transversely therethrough and axially therealong. Coil assembly 50 includes an annular core 52 of thin laminations, upon which are wrapped three windings 50a, 50b, 50c (FIG. 3) which are physically spaced at 120° relative to one another. The phasing of the windings 50a–c is indicated in the drawings by the small dots adjacent to the ends of the windings, the connection being such that the voltages in the windings are added to one another.

Magnet 51 is made longer in the direction of the rotation axis than the height of core 52, and magnetized across its transverse dimension such that, when rotated inside the core 52, the magnetic axis is perpendicular to the axis of the core. Thus, one exposed length of the magnet may have a first polarity and the diametrically opposite exposed length, the opposite polarity, indicated in FIG. 3 by N (north) and S (south).

Explanation of the basic theory of operation of the sensing system can be best visualized by assuming that no air gap exists between the magnet 51 and core 52. Therefore, as the magnet 51 rotates past winding 50a, for example, the magnetic flux $\phi_a$ coupled with the winding will vary as shown by the waveform 54 in FIG. 4. Of course, winding 50a must be assumed to be infinitely short. Hence, voltage $e_a$ induced in winding 50a will be as shown by the waveform 55 in FIG. 5. This waveform exhibits symmetry about its half and quarter wave points and, as a consequence, it contains a fundamental frequency and only odd harmonics. Since an air gap is necessary for the coil placement, the voltage output of a single winding is more nearly as that shown by the waveform 56 of FIG. 6, which has a lower harmonic content than the idealized waveform shown in FIG. 5.

By using identical windings 50a–c and using winding 50a as the standard reference for the phase of the induced voltages, the relative phase of the voltages induced in the respective windings for the fundamental and various odd harmonics can be tabulated as follows:

|  | Fundamental |  | 3rd Harmonic |  | 5th Harmonic |  |
|---|---|---|---|---|---|---|
|  |  | Degrees |  | Degrees |  | Degrees |
| Winding 50a | $e_a$ | 0 | $e_a$ | 0 | $e_a$ | 0 |
| Winding 50b | $e_b$ | 120 | $e_b$ | 360 | $e_b$ | 600 |
| Winding 50c | $e_c$ | 240 | $e_c$ | 720 | $e_c$ | 1,200 |

From the table, it can be seen that the windings 50a–c can be connected in two ways. In one way, with two windings in series-aiding relationship and the remaining winding having a reversed-phase series connection, the fundamental and fifth harmonic will provide an output voltage while the third harmonic is suppressed or, in another way, with three windings in series-aiding relationship, the fundamental and fifth harmonic can be suppressed and third harmonic provide the voltage output. For a low velocity rotation, a single frequency higher than the fundamental is desired. Hence, the phasing of the windings, as shown in FIG. 3 of the drawings, is used, since this phasing suppresses all voltages except the third harmonic. This same technique can be extended to higher harmonics by the use of N number of effective windings for the desired $N^{th}$ harmonic, bearing in mind, however, that the magnitude of the harmonic decreases with the order of the harmonic.

Since the core 52 has no salient pole pieces, the rotating magnet 51 has no affinity for a particular magnetic orientation. The *only* magnetic torque (starting torque) will result due to the retentivity of the core material. This can be controlled by the use of "soft iron" alloys which have a minimum of retentivity; moreover, since the core 52 is made of wrapped tape laminations, the magnetizing force across the core thickness will be extremely small. This unique feature makes this device suitable for applications (such as well flowmeters) where the starting torque must be extremely low.

It will be appreciated from the foregoing that the signal generated by the coil 50 and magnet 51 consists of three complete sinusoidal cycles for each revolution of the spinner shaft 33. Since the frequency output of the coil 50 is the measure of the speed of rotation of the spinner shaft 33, a frequency or events meter (not shown) in the surface recorder 24 may be employed to indicate the rotation speed. Since the velocity of flow is proportional to the shaft speed, the meter may be prepared to indicate the rate of flow directly.

With the foregoing spinner system employed in a packerless flowmeter, a centralizer (not shown) may be employed. Also, for high rates of fluid flow, say 5000 b.p.d. or up, the diameter of the tool does not particularly affect the results; however, for lower flow rates, larger tools with lower bypass rates are preferred.

Turning now to FIGS. 7 and 8, another embodiment of the present invention is illustrated. In the embodiment of FIGS. 7 and 8, an asymmetrically magnetized magnet 60 and a coil 63 are included in a sensing system for determining both the rate and direction of fluid flow. The cylindrical rod magnet 60 is provided with suitable upper and lower attaching means 61, 62 so that the magnet may be coupled as an intermediate, rotational, balanced section in a modified version of spinner shaft 33. The magnet 60 is magnetized along its length asymmetrically with respect to a horizontal plane as indicated by the north "N" and south "S" poles on the magnet. As shown, the magnetic poles may be spaced angularly 90° from one another. Coil 63 is located with its main axis perpendicular to the longitudinal axis of the magnet 60 and intermediate of the length of the magnet. As will be appreciated, the magnet 60 and coil 63 can be readily substituted in the spinner apparatus of FIG. 2.

Due to the described arrangement of the coil 63 and magnet 60, there is developed, upon rotation of the magnet 60 about its main axis, a shaped or coded signal which makes it possible to distinguish both the direction of rotation and the rotational speed. As shown in FIG. 9, rotation of the magnet 60 about its main axis in one direction produces signal having a waveform 65 comprised principally of a fundamental and second harmonic (about 30%). A cycle of the waveform 65 includes a relatively negative portion for a time period $t_2$ of the cycle, a positive portion for a time period $t_1$ of the cycle, the time period $t_2$ being greater than the time period $t_1$.

As shown in FIG. 10, rotation of the magnet 60 in an opposite direction will develop a waveform 66 in which a cycle includes a relatively negative portion for time period $t_1$ of the cycle and a positive portion for time period $t_2$, the time period $t_2$ being greater than the time period $t_1$.

Turning now to FIG. 11, a signal from the coil 63 is supplied to a conventional frequency converter 70 via an amplifier 71. The frequency converter 70 converts the frequency of the signal into a direct current voltage signal which is supplied via a polarity switch or relay 72 to a galvanometer 73 which indicates the sense and rate of rotation of the shaft and the speed of the flow of fluid. The galvanometer is of a type in which the direction of deflection, i.e. the right or left from a zero reference, is an indication of the direction of flow. As could be surmised, the switch 72 in one condition connects the galvanometer 73 to the converter 70 to deflect in one direction and in the other condition of the switch, the galvanometer is connected to the converter 70 so as to deflect in an opposite direction.

An output from the amplifier 71 is supplied to an asymmetry detector 76 which develops a positive or negative output signal, depending upon the direction of rotation of magnet 60. This positive or negative output signal is amplified by an amplifier 77 and, in turn, controls the condition of the switch 72, as above described.

The asymmetry detector 76, as shown in FIG. 12, includes a saturating amplifier 80 which is responsive to waveforms 65 or 66 to produce an output signal consisting of a sequence of rectangularly shaped output pulses and a double diode clamp 81 across which is connected a potentiometer 82. The clamp 81 serves to clamp the output signal or pulses of amplifier 80 to a reference so that positive and negative voltage pulses of amplitude E are developed. For example, for waveform 65, a positive pulse with an amplitude E is developed during the time $t_2$ in which the positively clamped pulse appears is greater than the time $t_1$ in which the negatively clamped pulse appears. Stated more precisely, the D.-C. voltage output appearing at the center of the potentiometer between the potentiometer arm and a ground reference when waveform 65 is applied to amplifier 80 is positive and equal in magnitude to $$+\frac{E}{2}\left(\frac{t_2-t_1}{t_2+t_1}\right)$$

However, for waveform 66, the average voltage is negative since the time $t_2$ in which a negatively clamped pulse with a voltage E appears is greater than the time $t_1$ in which the positively clamped pulse with a voltage E appears. Stated precisely, the voltage output appearing at the center of the potentiometer will be equal to $$-\frac{E}{2}\left(\frac{t_2-t_1}{t_2+t_1}\right)$$

Hence, the polarity of the output of the asymmetry detector 76 changes according to the direction of rotation of magnet 60. The output of detector 76 is amplified by the amplifier 77 and operates the polarity switch 72 to control the direction in which the galvanometer deflects.

It will be appreciated, from the foregoing, that, if desired, the waveform 65 or 66 can be applied directly to a digital counter or meter (not shown) while the output of the asymmetry detector 76 is applied to an indicator means such as a meter (not shown). Hence, the switch 72 could be eliminated if separate meters are employed.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

I claim:

1. Flowmeter apparatus including a housing and a shaft rotatably mounted in said housing to rotate in response to fluid flow; magnet means on said shaft for producing a magnetic field; coil means in said housing including an annular core co-axially disposed about said magnet means, at least three windings on said core equidistantly spaced from one another and connected to one another so as to develop a predominant harmonic signal in response to relative rotation between said magnet means and said coil means.

2. Flowmeter apparatus including a housing and a shaft rotatably mounted in said housing to rotate in response to fluid flow; magnet means on said shaft for producing a magnetic field; coil means in said housing including an annular core co-axially disposed about said magnet means, at least N number of effective windings on said core equidistantly spaced from one another and connected to one another so as to develop a predominant $N^{th}$ harmonic signal in response to relative rotation between said magnet means and said coil means.

3. Flowmeter apparatus including a housing and a shaft rotatably mounted in said housing to rotate in response to fluid flow; magnet means on said shaft to produce a magnetic field; coil means in said housing including an annular core co-axially disposed about said magnet means, at least three windings on said core equidistantly spaced from one another on said core and connected to one another to develop a predominant third harmonic signal in response to relative rotation between said magnet means and said coil means.

4. Flowmeter apparatus including a housing and a shaft rotatably mounted in said housing to rotate in response to fluid flow; magnet means on said shaft to produce a magnetic field, said magnet means having poles circumferentially spaced relative to one another at an included angle which is less than 180°; coil means in said housing disposed adjacent but separate from said magnet means to develop electrical signals in response to said magnetic field as said shaft is rotated to obtain indications of the angular velocity of said shaft.

5. Flowmeter apparatus including a housing and a shaft rotatably mounted in said housing to rotate in response to fluid flow; magnet means on said shaft to produce a magnetic field, said magnet means having poles circumferentially spaced relative to one another at an included angle which is less than 180°; coil means in said housing disposed adjacent but separate from said magnet means to develop electrical signals of alternating polarity with first and second characteristics in response to said magnetic field as said shaft is rotated; an indicating system responsive to said electrical signals for deriving indications of the velocity of fluid flow and direction of fluid flow in said flowmeter apparatus, said system including first translating means for converting said first characteristics of said electrical signals into first D.C. signals representative of the velocity of fluid flow; second translating means for converting said second characteristics of said electrical signals into second D.C. signals having a relative polarity dependent upon the direction of flow of fluid; indicator means responsive to said first D.C. signals for indicating velocity of fluid flow; and means responsive to said second D.C. signals for obtaining indications of the direction of fluid flow.

6. Flowmeter apparatus including a housing and a shaft rotatably mounted in said housing to rotate in response to fluid flow; magnet means on said shaft to produce a magnetic field and having poles circumferentially spaced relative to one another at an included angle which is less than 180°; coil means in said housing disposed adjacent but separate from said magnet means to develop electrical signals of alternating polarity with first and second characteristics in response to said magnetic field as said shaft is rotated; indicator means; means responsive to said first characteristics of said electrical signals for supplying a first D.C. signal representative of the velocity of a fluid flow to said indicator; and means responsive to said second characteristics of said electrical signals for supplying a second D.C. signal representative of the direction of fluid flow to said indicator means.

7. Flowmeter apparatus including a housing and a shaft rotatably mounted in said housing to rotate in response to fluid flow; magnet means on said shaft to produce a magnetic field and having poles circumferentially spaced relative to one another at an included angle which is less than 180°; coil means in said housing disposed adjacent said magnetic means to develop electrical signals of alternating polarity in response to said magnetic field as said shaft is rotated; indicator means; frequency sensitive means responsive to the frequency of said electrical signals for supplying a first D.C. signal representative of the velocity of fluid flow; switch means coupling said frequency means to said indicator means and operative to reverse connections to said indicator means; detector means responsive to the predominate polarity of said electrical signals for supplying a second D.C. signal of such a predominate polarity representative of the direction of fluid flow, said second D.C. signals serving to control the operation of said switch means.

8. Flowmeter apparatus including a housing and a shaft rotatably mounted in said housing to rotate in response to fluid flow; magnet means on said shaft to produce a magnetic field and having poles circumferentially spaced relative to one another at an included angle which is less than 180°; coil means in said housing disposed adjacent said magnetic means to develop electrical signals of alternating polarity in response to said magnetic field as said shaft is rotated; indicator means; frequency sensitive means responsive to the frequency of said electrical signals for supplying a first D.C. signal representative of the velocity of fluid flow; polarity sensitive switch means coupling said frequency means to said indicator means and operative to reverse connections to said indicator means; detector means including a saturating amplifier circuit for developing shaped pulses in response to said electrical signals and a double diode clamp circuit for developing a second D.C. signal with polarity representative of the direction of fluid flow, said double diode clamp circuit being coupled to said switch means to control its operation.

9. Flowmeter apparatus including a housing; a shaft rotatably mounted in said housing to rotate about its longitudinal axis in response to fluid flow; magnet means on said shaft for producing a magnetic field; detecting means in said housing including at least one detecting coil disposed adjacent but separate from said magnet means for detecting the magnetic field of said magnet means upon rotation of said shaft and magnet means, said detecting means having uniform magnetic properties about the periphery of said magnet means on said shaft for eliminating any preferential magnetic attraction between said magnet means and said detecting means; said magnet means and coil cooperating for developing electrical signals having a waveform and frequency related to rotation of the magnet means on the shaft relative to said coil.

References Cited in the file of this patent
UNITED STATES PATENTS

| 1,870,849 | Hodgson | Aug. 9, 1932 |
| 2,770,131 | Sparling | Nov. 13, 1956 |
| 2,934,947 | Buck | May 3, 1960 |
| 2,962,895 | Rumble | Dec. 6, 1960 |

FOREIGN PATENTS

| 803,069 | Great Britain | Oct. 15, 1958 |